Sept. 5, 1967 G. L. KAMPA 3,339,876
SIDE MOUNT REAR VIEW TRUCK MIRROR
Filed June 29, 1964 2 Sheets-Sheet 1
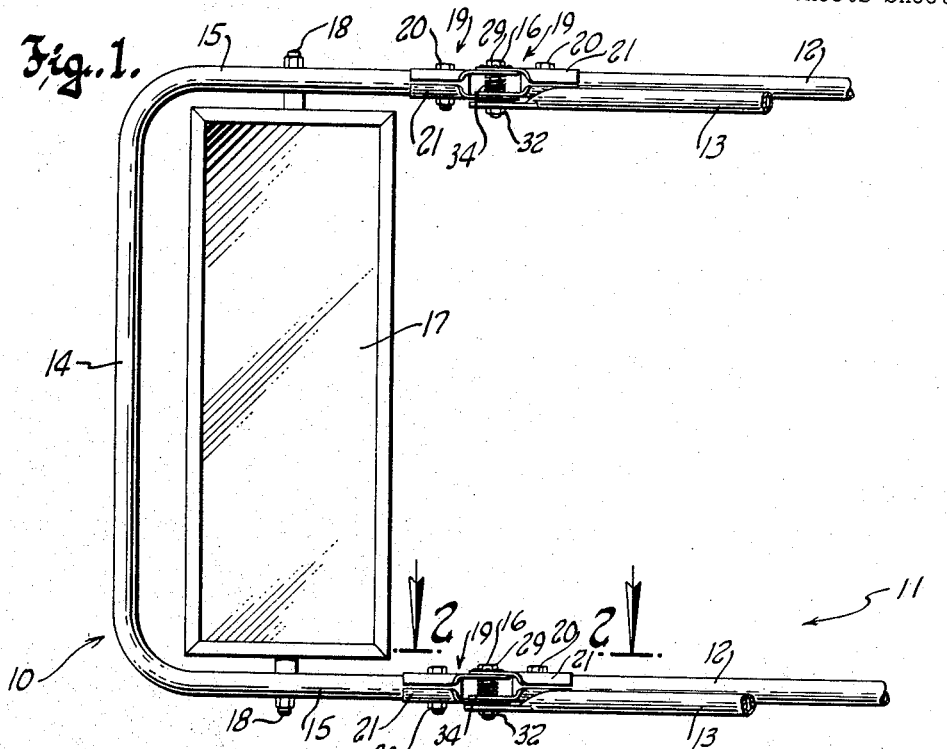
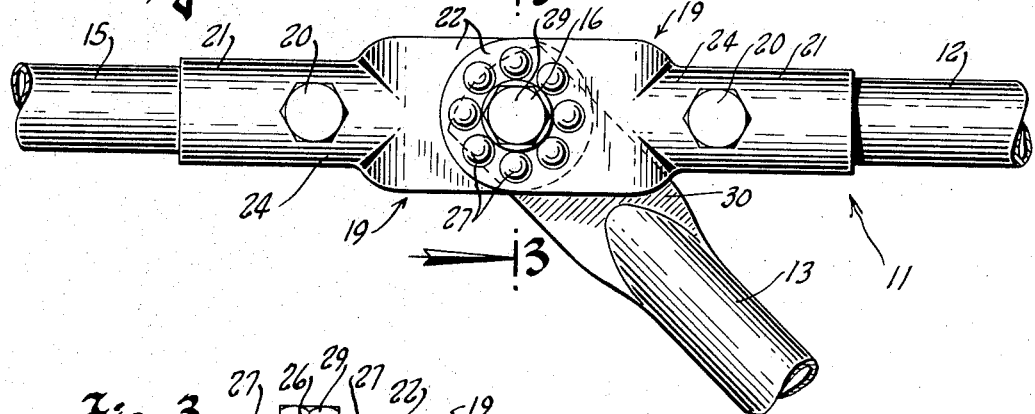
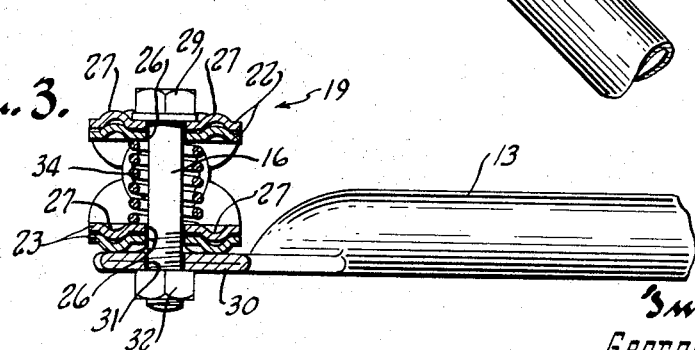
Inventor
George L. Kampa Sept. 5, 1967  G. L. KAMPA  3,339,876
SIDE MOUNT REAR VIEW TRUCK MIRROR
Filed June 29, 1964  2 Sheets-Sheet 2
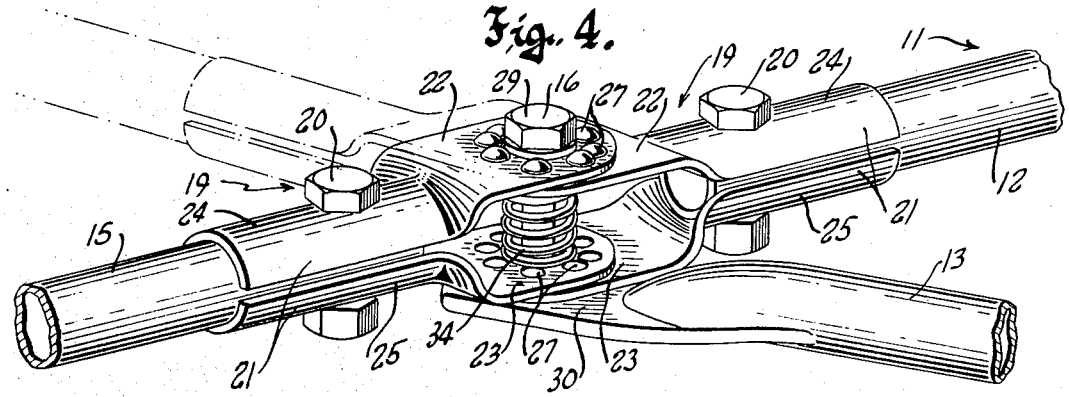
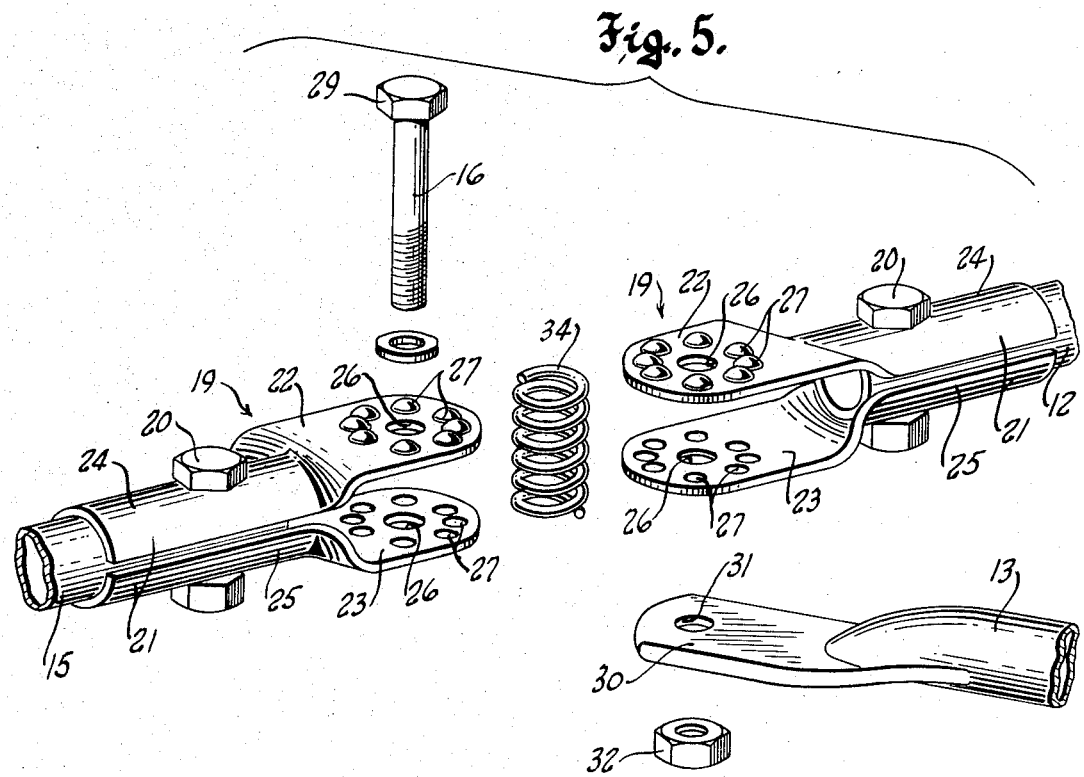

United States Patent Office 3,339,876
Patented Sept. 5, 1967

3,339,876
SIDE MOUNT REAR VIEW TRUCK MIRROR
George L. Kampa, Minneapolis, Minn., assignor to J. W. Speaker Corporation, Milwaukee, Wis., a corporation of Illinois
Filed June 29, 1964, Ser. No. 378,575
2 Claims. (Cl. 248—478)

ABSTRACT OF THE DISCLOSURE

Pivot defining bolts passing through interleaved and detented bifurcations on cooperating identical clevises attached to the ends of upper and lower bracket arms and to the ends of the upper and lower frame arms of a side mount rear view mirror provide for adjustment of the position of the mirror frame about a vertical axis. Each clevis is comprised of a pair of complementay clevis halves, and each clevis half has one of the detented bifurcations between as well as an arm engaging portion by which it can be secured to its arm.

---

This invention relates to side mounted rear view mirrors for trucks, and has more particular reference to improvements in so called retractable side mount mirrors.

Side view truck mirrors of this type are characterized by a mirror supporting frame which is supported by a bracket on the side of a truck cab for swinging movement from an outwardly extended position of use to a retracted position near the side of the cab, to enable the supporting frame and the mirror thereon to be placed in a protected position whenever the truck is to be driven into close quarters along the sides of buildings or other stationary structures.

In general, it is the purpose of this inveniton to provide a side mount rear view mirror for trucks which features exceptionally simple means for pivotally connecting its mirror supporting frame to the mounting bracket on the truck cab to enable the frame with the mirror thereon to be swung from an outwardly extended position of use to a retracted and protected position alongside the truck cab.

It is also a purpose of this invention to incorporate novel detent means in the pivotal connections between the mirror supporting frame and the mounting bracket, to facilitate return of the mirror supporting frame to substantially any desired extended position of use.

In a more specific sense, it is a purpose of this invention to provide a side view mirror of the character described which features a particularly unique use of clevises in the pivotal connections between spaced upper and lower arms on the mirror supporting frame and similarly spaced but fixed upper and lower arms on the mounting bracket, and wherein the clevises are provided by complementary clevis sections that can be formed as identical low cost stampings.

With these and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

FIGURE 1 is an elevational view of the rear view mirror of this invention;

FIGURE 2 is an enlarged fragmentary plan view taken along the plane of the line 2—2 in FIGURE 1, and showing the pivotal connection between one of the frame and bracket arms;

FIGURE 3 is a sectional view taken through FIGURE 2 on the plane of the line 3—3;

FIGURE 4 is a fragmentary perspective view of the pivotal connection seen in FIGURE 2, and illustrating a second position of the frame arm in construction lines; and FIGURE 5 is a group perspective view showing the pivot defining members of FIGURE 4 separated from one another.

Referring now are particularly to the accompanying drawings wherein like reference characters identify like parts throughout the views, the numeral 10 generally designates the mirror supporting frame of a side mount rear view truck mirror of this invention. The frame 10 is carried by a bracket generally designated 11 which is adapted to be fixed to the side of a truck cab (not shown) in any suitable or conventional manner.

As is usual in side view mirror assemblies of this type, the mounting bracket 11 comprises spaced upper and lower main arms 12 of tubular construction, which project horizontally outwardly from the side of the truck cab, and braces 13, one for each arm, converging toward and connected to the outer end portion thereof to lend rigidity to the mounting bracket.

The mirror supporting frame 10 is likewise of tubular construction and comprises an upright frame member 14 and upper and lower arms 15 which project horizontally from its ends so that the frame may be said to have a C-shaped configuration when viewed in side elevation, as seen in FIGURE 1. The frame arms 15 are spaced apart substantially the same distance as the bracket arms and their ends are pivotally connected to the outer ends of the bracket arms by separate pivot members or pins 16 in a manner to be discussed shortly, to enable the frame to swing about a vertical axis relative to the mounting bracket from a position of use such as seen in FIGURE 1 and at which the frame arms provide outward extensions of the bracket arms, to a retracted position near the side of the truck cab to allow the truck to travel more closely alongside buildings and other structures.

The usual vertically elongated mirror 17 is mounted on the supporting frame 10, between its arms 15, as by studs 18 which allow the mirror to be adjusted about a vertical axis intermediate the upright member 14 of the frame and the axis of the pivot members 16.

According to this invention, the arms 15 of the mirror supporting frame are pivotally connected to the outer ends of the bracket arms 12 by clevises 19, one fixed to the end of each of the arms 12 and 15 as by a bolt 20. Each such clevis has a tube-like socket 21 in which the end of its arm is received and through which the bolt 20 passes to mount the clevis on the arm, and a pair of spaced apart, substantially flat upper and lower bifurcations 22 and 23, respectively, projecting outwardly beyond the end of its arm. These clevises are identical, even to the spacing of their bifurcations, and it is a further feature of this invention that each clevis is comprised of identical complementary top and bottom clevis sections 24 and 25, respectively. Each of these complementary clevis sections has one of the bifurcations formed thereon, and an arm engaging socket portion shaped to engage nearly half-way around the end portion of the arm to which it is secured by the bolt 20.

The bifurcations of each clevis have holes 26 therein to receive the pivot member 16, and are formed with an equal number of indentations defining rounded detent elements 27 arranged in circumferentially equispaced relation along circles which are concentric to the axis of their holes and to project axially outwardly from the outer faces of the bifurcations.

FIGURE 4 best illustrates the axial arrangement of the bifurcations on each pair of adjacent and cooperating clevises with respect to the pivot members 16 connecting the clevises. As therein seen, the bifurcations on one of the clevises are flatwise superimposed upon and contiguous to the upper surfaces of the bifurcations of the cooperating clevis, so that the bifurcations on the cooperating clevises may be said to be interleaved with respect to one another. Accordingly, the detent elements 27 on one of the bifurcations of each pair of cooperating clevises can nest in the detent defining indentations of its contiguous bifurcation on the other clevis at any one of a number of different positions of adjustment of the frame arms 15 angularly relative to the bracket arms 12, to define said positions.

Each of the pivot members or pins 16 is preferably provided by the stem of a bolt which passes through the holes 26 in the bifurcations of its associated clevises. A head 29 on one end of each bolt thus overlies one of the axially outermost bifurcations through which the bolt passes. In the present case, the outer end of each brace 13 is connected to the pivot pin or bolt 16, and for this purpose its outer end is flattened as at 30 to lie substantially flatwise under the other axially outermost bifurcation. The threaded end of the bolt passes through a hole 31 in the flattened end 30 of the brace, and has a nut 32 threaded thereon to hold the pivot member against displacement.

With the construction described, detent pressure sufficient to yieldingly hold the mirror supporting frame 10 in any convenient extended position of adjustment about the axis of the bolts or pivot members 16 can be achieved by tightening the nuts 32 on the bolts. There is sufficient resiliency in the clevis bifurcations for that purpose.

If desired, however, a coiled expansion spring 34 encircling each of the bolts and confined between the axially innermost bifurcations on each pair of cooperating clevises can be employed to maintain the detents engaged with the proper pressure, especially if the bifurcations are substantially stiff and unyielding. In that event, of course, the nuts 32 should not be turned so tight on the bolt stems as to preclude slight axial separation of the contiguous bifurcations during the time the detents are out of nesting engagement.

While the outer ends of the braces 13 have been shown connected to the pivot members or bolts 16, it will be understood that they can alternatively be connected to the outer end portions of their respective brackets arms 12 by the same bolts 20 that secure the clevises thereto. In that event, the nuts 32 on the pivot bolts 16 would be drawn up to the axially outermost bifurcations remote from the heads of the bolts.

From the foregoing description, together with the accompanying drawings, it will be readily apparent that this invention provides exceptionally simple and low cost detented pivot means for the retractable mirror supporting frame of a side mounted rear view mirror.

What is claimed as my invention is:

1. A side mount rear view mirror of the type comprising bracket means securable to the side of a truck and having upper and lower arms that project outwardly from the side of a truck having the bracket means in place thereon, and a mirror supporting frame comprising an upright member and upper and lower arms projecting in the same direction therefrom and having their ends pivotally connected with the outer ends of the bracket arms to enable the frame to be swung about a vertical axis toward and from the side of a truck, wherein said pivotal connections are characterized by the following:

(A) cooperating identical clevises on the end of each frame arm and on the adjacent end of each bracket arm, each clevis comprising
  (1) spaced apart substantially flat upper and lower bifurcations projecting from the end of its arm toward the adjacent clevis and flatwise engaged with the respective upper and lower bifurcations of the latter,
  (2) and holes in the bifurcations of all the clevises, disposed on said vertical axis;
(B) a separate pivot member passing through the holes in the bifurcations of each pair of adjacent clevises to connect the frame to the bracket means for swinging motion relative thereto about said vertical axis;
(C) cooperating detent means on the clevis bifurcations for releasably holding the frame in each of a number of positions of adjustment about said vertical axis;
(D) a coiled expansion spring encircling each of said pivot members and confined between the axially innermost bifurcations through which its pivot member passes, to maintain detent pressure upon said detent means;
(E) the bifurcations of said clevises being spaced apart the same distance, and the bifurcations on one of each pair of cooperating clevises flatwise engaging the upper surfaces of the bifurcations of its cooperating clevis;
(F) each of said clevises being comprised of a pair of complementary clevis sections each having one of the bifurcations thereon and an arm engaging portion by which it can be attached to its arm;
(G) and bolts securing the clevis sections to their respective arms.

2. A side mount rear view mirror of the type comprising stationary upper and lower arms which are securable at one end to the side of a truck, and a movable frame which carries the mirror and has upper and lower arms pivotally connected at one end with the outer ends of the stationary arms to enable the frame and mirror thereon to be swung as a unit about a vertical axis toward the side of a truck from a normal position of use at which the frame arms in effect provide outward extensions of the stationary arms, characterized by the following:

(A) a pair of cooperating identical clevises on the outer end of each stationary arm and on the adjacent end of its frame arm, each of said clevises having
  (1) spaced, substantially flat top and bottom bifurcations interleaved with the bifurcations of its cooperating clevis, and the bifurcations of one of each pair of clevises being flatwise superimposed upon the bifurcations of its cooperating clevis,
  (2) and holes in the bifurcations of all the clevises, disposed on said vertical axis;
(B) a pair of bolts, one passing through the holes in the bifurcations of each pair of cooperating clevises to provide said pivotal connection between the stationary arms and the frame arms;
(C) each of said clevises comprising a pair of cooperating clevis halves each having one of the clevis bifurcations thereon and an attaching portion to engage over its arm;
(D) common means securing each of the clevis halves together and to its arm;
(E) cooperating detent defining means on each of the bifurcations of each pair of superimposed bifurcations, for releasably holding the frame in each of a number of positions of adjustment about said vertical axis;
(F) and a coiled expansion spring encircling each bolt and reacting between the axially innermost bifurcations through which the bolt passes to maintain detent pressure upon the detent means.

(References on following page)

References Cited

UNITED STATES PATENTS

| | | | |
|---|---|---|---|
| 1,687,174 | 10/1928 | Mountford et al. | 16—140 |
| 2,035,411 | 3/1936 | Udell | 287—14 |
| 2,555,226 | 5/1951 | Draughn | 287—14 |
| 2,969,715 | 1/1961 | Mosby | 248—478 |

FOREIGN PATENTS

| | | |
|---|---|---|
| 21,014 | 1/1936 | Australia. |
| 474,459 | 11/1937 | Great Britain. |

ROY D. FRAZIER, *Primary Examiner.*

CHANCELLOR E. HARRIS, *Examiner.*

W. D. LOULAN, *Assistant Examiner.*